L. B. THYNG.
RAILROAD CAR.
No. 4,276. Patented Nov. 18, 1845.
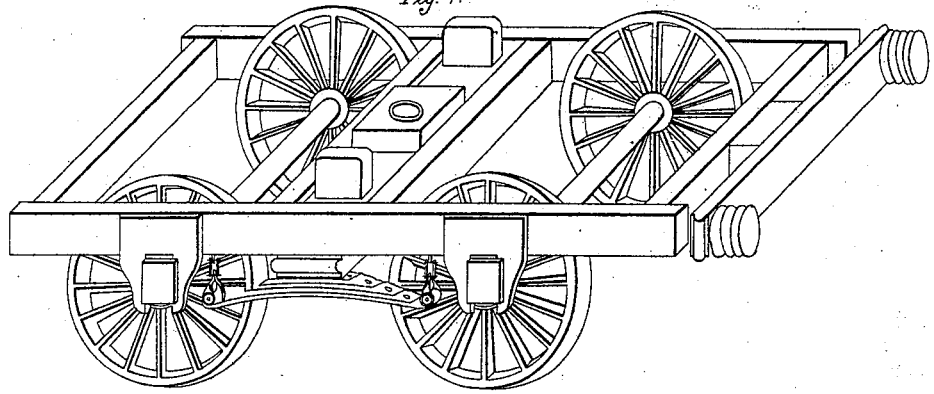
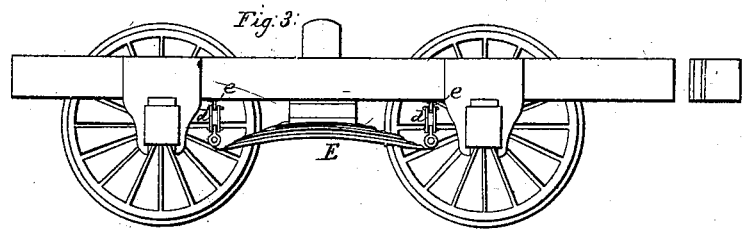
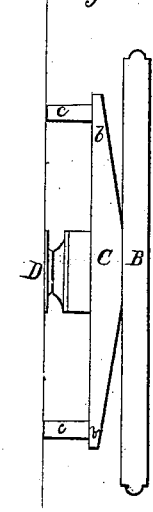
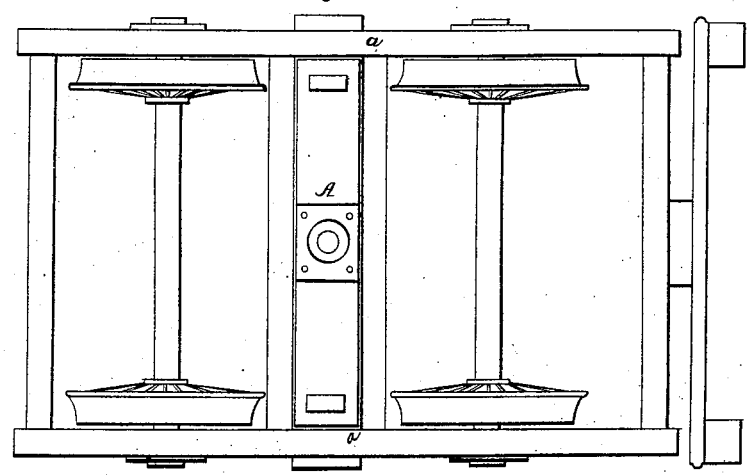
Witnesses: Inventor: Levi B. Thyng

UNITED STATES PATENT OFFICE.

LEVI B. THYNG, OF LOWELL, MASSACHUSETTS.

HANGING CAR-BODIES.

Specification of Letters Patent No. 4,276, dated November 18, 1845; Antedated May 17, 1845.

*To all whom it may concern:*

Be it known that I, LEVI B. THYNG, of Lowell, in the county of Middlesex and State of Massachusetts, have invented a new and Improved Mode of Hanging Railroad-Car Bodies to Their Carriages or Trucks; and I do hereby declare that the following is a full, clear, and exact description.

The nature of my invention consists in supporting the car body on a flexible or equalizing bolster and suspending and governing the lateral motion of the same by shackles attached to the truck or carriage frame, thereby giving the car ease when in motion.

To enable others skilled in the art to make and use my invention, I will proceed to describe its construction and operation.

I construct a flexible or equalizing bolster (A, Figure 1) as shown by the accompanying drawing, of two or more pieces of wood twelve inches wide and three inches thick or of such thickness as is necessary to support the car-body and its freight. The length of the bottom piece or plank (B, Fig. 2) is two inches longer than the outside width of the truck frame (a, a, Fig. 1.) The top surface of this part of the bolster is placed nearly or quite in contact with the bottom surface of the truck frame. The other parts or plank (C, Fig. 2) is of the same width and may be four inches shorter than the inside width of the truck frame. This allows the bolster to move endwise, and the car-body to move laterally independent of the truck. The top part (C, Fig. 2) of the bolster is tapered at the ends (b, b,) sufficient to spring whenever there is an inequality of weight on the bearing points (c, c, Fig. 2). These points (c, c,) together with the coupling at the center support the car-body, (D, Fig. 2). The bolster is fastened together by bolts passing through the center and securing the bottom coupling to the same. The bolster is supported by springs E, Fig. 3, one at each end. These springs are immediately under and parallel with the truck frame. Each end of these springs is supported and attached by shackles (d, d, Fig. 3,) about three inches long between joints, to studs (e, e, Fig. 3) which are secured to the truck frame. The bolster is allowed to move endwise freely between two girts in the truck frame. This motion which gives the car-body its lateral motion, is governed by the shackles, and will be more or less according to their length. The longer the shackles, the greater the motion. This arrangement in hanging and supporting the car-body gives it a very gentle and easy motion in passing over an undulating or zig zag rail.

What I claim as my invention and desire to secure by Letters Patent, is—

The mode herein described of hanging the car-body and governing its lateral motion, that is to say—the spring bolster constructed, and governed in its motion substantially as herein described, in combination with the springs and shackles—the whole being constructed and operating substantially as herein set forth.

Lowell Nov. 10th, 1845.

LEVI B. THYNG.

Witnesses:
JOEL ADAMS,
JOHN A. KNOWLES.